United States Patent
Jędrzejewski et al.

(10) Patent No.: US 11,854,433 B2
(45) Date of Patent: Dec. 26, 2023

(54) SYSTEMS AND METHODS FOR ITEM RESPONSE MODELLING OF DIGITAL ASSESSMENTS

(71) Applicant: Pearson Education, Inc., Hoboken, NJ (US)

(72) Inventors: Krzysztof Jędrzejewski, Poznań (PL); Quinn Lathrop, Denver, CO (US); Kacper Lodzikowski, Poznań (PL); Tomasz Matysiak, Rakoniewice (PL); Mateusz Otmianowski, Poznań (PL); Malgorzata Schmidt, Poznań (PL)

(73) Assignee: PEARSON EDUCATION, INC., Bloomington, MN (US)

( * ) Notice: Subject to any disclaimer, the term of this patent is extended or adjusted under 35 U.S.C. 154(b) by 1187 days.

(21) Appl. No.: 16/267,281

(22) Filed: Feb. 4, 2019

(65) Prior Publication Data

US 2020/0251007 A1    Aug. 6, 2020

(51) Int. Cl.
*G06F 16/906* (2019.01)
*G09B 7/04* (2006.01)
(Continued)

(52) U.S. Cl.
CPC ............. *G09B 7/04* (2013.01); *G06F 17/17* (2013.01); *G06F 17/18* (2013.01); *G09B 7/077* (2013.01); *G06T 1/20* (2013.01)

(58) Field of Classification Search
CPC ........... G09B 7/04; G09B 7/077; G06F 17/17; G06F 17/18; G06F 2216/03; G06F 16/906; G06T 1/20; G06Q 10/10
See application file for complete search history.

(56) References Cited

U.S. PATENT DOCUMENTS 6,965,816 B2 * 11/2005 Walker ................. G08B 31/00
701/16
7,930,262 B2 * 4/2011 Friedlander ............ G06N 5/04
706/62

(Continued)

FOREIGN PATENT DOCUMENTS

GB          2545507       * 12/2015
GB          2545508       * 12/2015
(Continued)

OTHER PUBLICATIONS

Böhm, Christian et al., "Data Mining Using Graphics Processing Units", SAT 2015 18th International Conference, Austin, TX, USA, Sep. 24-27, 2015; [Lecture Notes in Computer Science], Springer, Berlin, Heidelberg, pp. 63-90, XP047380247, ISBN: 978-3-540-74549-5.

(Continued)

*Primary Examiner* — Philip P. Dang
(74) *Attorney, Agent, or Firm* — Quarles & Brady LLP

(57) ABSTRACT

Systems and methods of the present invention provide for estimating latent ability of responders to a digital assessment in the form of ability scores and estimating item parameters an assessment item of the digital assessment including difficulty scores and discrimination scores. Maximum likelihood estimation may be performed based on an item response theory model to estimate the item parameters. Supervisory, extraction, and worker modules of a workflow manager module may initiate general purpose graphics processing unit instances and cause these instances to perform the maximum likelihood estimation calculations. The item response theory model may be a two parameter model that is modified to account for changes in difficulty caused by the use of hints.

20 Claims, 7 Drawing Sheets

(51) Int. Cl.
*G09B 7/077* (2006.01)
*G06F 17/18* (2006.01)
*G06F 17/17* (2006.01)
*G06T 1/20* (2006.01)

(56) References Cited

U.S. PATENT DOCUMENTS

| | | | | |
|---|---|---|---|---|
| 8,805,110 | B2* | 8/2014 | Rhoads | H04L 67/34 |
| | | | | 455/418 |
| 8,886,206 | B2* | 11/2014 | Lord | H04N 23/10 |
| | | | | 348/241 |
| 8,929,877 | B2* | 1/2015 | Rhoads | G06V 10/945 |
| | | | | 455/420 |
| 9,141,823 | B2* | 9/2015 | Dawson | H04L 9/00 |
| 9,142,004 | B2* | 9/2015 | Abiezzi | G06T 1/20 |
| 9,204,038 | B2* | 12/2015 | Lord | G06F 16/50 |
| 9,271,133 | B2* | 2/2016 | Rodriguez | H04N 1/00331 |
| 9,378,536 | B2* | 6/2016 | Park | G06F 1/3206 |
| 9,432,298 | B1* | 8/2016 | Smith | H04L 49/9057 |
| 9,646,250 | B1* | 5/2017 | Indurthi | G06F 16/24522 |
| 9,727,942 | B2* | 8/2017 | Nagai | G06F 9/5044 |
| 9,781,148 | B2* | 10/2017 | Mahaffey | H04L 63/166 |
| 9,952,655 | B1* | 4/2018 | Jane | G06F 9/30145 |
| 10,002,021 | B2* | 6/2018 | Metz | G06F 9/461 |
| 10,007,292 | B2* | 6/2018 | Sylvester | G06F 1/324 |
| 10,120,705 | B2* | 11/2018 | Han | G06F 9/4411 |
| 10,229,471 | B2* | 3/2019 | Avkarogullari | G06F 1/3215 |
| 10,338,953 | B2* | 7/2019 | Ashbaugh | G06F 9/3851 |
| 10,346,943 | B2* | 7/2019 | Gould | G06F 9/3804 |
| 10,373,284 | B2* | 8/2019 | Kurtz | G06F 9/505 |
| 10,417,690 | B2* | 9/2019 | Mueller | G06Q 30/0635 |
| 10,482,570 | B2* | 11/2019 | Mitchell | G06F 12/0802 |
| 10,592,386 | B2* | 3/2020 | Walters | G06F 16/9038 |
| 10,852,811 | B2* | 12/2020 | Idgunji | G06F 1/324 |
| 10,866,956 | B2* | 12/2020 | Capps | G09B 7/00 |
| 10,949,985 | B2* | 3/2021 | Murray Herrera | H04N 19/00 |
| 10,997,251 | B2* | 5/2021 | Tran | G06Q 50/14 |
| 11,030,095 | B2* | 6/2021 | Sakharshete | G06F 17/16 |
| 11,093,590 | B2* | 8/2021 | Erhart | B25J 19/023 |
| 11,159,909 | B2* | 10/2021 | Anderson | G01S 19/35 |
| 11,345,040 | B2* | 5/2022 | Oleynik | G05B 19/4183 |
| 11,435,813 | B2* | 9/2022 | Sadowski | G06T 1/20 |
| 2008/0228747 | A1* | 9/2008 | Thrall | G06Q 50/20 |
| | | | | 707/999.005 |
| 2009/0162827 | A1* | 6/2009 | Benson | G06F 16/285 |
| | | | | 434/350 |
| 2010/0159432 | A1* | 6/2010 | German | G06Q 10/10 |
| | | | | 434/350 |
| 2013/0226674 | A1* | 8/2013 | Field | G06Q 50/20 |
| | | | | 705/7.38 |
| 2013/0246339 | A1* | 9/2013 | Kendrena | G06F 16/285 |
| | | | | 707/602 |
| 2014/0195466 | A1* | 7/2014 | Phillipps | G06F 16/00 |
| | | | | 706/12 |
| 2015/0079576 | A1* | 3/2015 | Obae | G09B 7/00 |
| | | | | 434/350 |
| 2015/0348433 | A1* | 12/2015 | Gatterbauer | G06Q 10/101 |
| | | | | 434/353 |
| 2017/0154403 | A1* | 6/2017 | Toth | G06T 1/20 |
| 2017/0261949 | A1* | 9/2017 | Hoffmann | G06N 7/01 |
| 2018/0176312 | A1* | 6/2018 | Smietana | G06Q 30/0242 |
| 2018/0308473 | A1* | 10/2018 | Scholar | A63F 13/00 |
| 2018/0366019 | A1* | 12/2018 | Zertuche | G06Q 50/20 |
| 2019/0139428 | A1* | 5/2019 | Hatton | G09B 19/00 |
| 2019/0189022 | A1* | 6/2019 | Kokku | G06F 16/252 |
| 2019/0378429 | A1* | 12/2019 | Panuganty | G06F 50/20 |
| 2020/0067861 | A1* | 2/2020 | Leddy | G06F 21/6245 |

FOREIGN PATENT DOCUMENTS

| | | | |
|---|---|---|---|
| GB | 2545507 | * | 6/2017 |
| GB | 2545508 | * | 6/2017 |

OTHER PUBLICATIONS

Extended European Search Report and Written Opinion, European Application No. EP20752241.8, dated Sep. 19, 2022.

* cited by examiner

SYSTEMS AND METHODS FOR ITEM RESPONSE MODELLING OF DIGITAL ASSESSMENTS

FIELD OF THE INVENTION

This disclosure relates to the field of systems and methods for evaluating the latent abilities of responders to digital assessments and evaluating the quality of assessment items of the digital assessments using virtual computing environments.

SUMMARY OF THE INVENTION

The present invention provides systems and methods for the evaluation of the latent ability of responders to digital assessments and the evaluation of the quality of assessment items of digital assessments.

In an example embodiment, a system may include a plurality of client computer devices that generate response data for at least one digital assessment of a title, the digital assessment including at least one assessment item based on responses input by a plurality of responders, at least one electronic communication network coupled to the plurality of client computer devices, a source data store server having a first computer memory that stores at least one source database, at least one workflow manager server coupled to the source data store via the electronic communications network, and a target data store server. The source data store server may be in electronic communication with the plurality of client computer devices via the at least one electronic communication network. The source data store server may receive the response data from the plurality of client computer devices. The at least one source database may store assessment data corresponding to the at least one digital assessment. The at least one workflow manager server may include at least one computer processor, at least one general purpose graphics processing unit, and a second computer memory configured to store computer-readable instructions. The computer-readable instructions, when executed by the at least one computer processor, may cause the at least one computer processor to initiate a workflow manager module comprising one or more supervisory modules configured to initiate a general purpose graphics processing unit instance executed by the at least one general purpose graphics processing unit, one or more extraction modules configured to retrieve the assessment data from the source database of the source data store server, and to pre-process the assessment data to produce pre-processed assessment data, and one or more worker modules configured to cause the general purpose graphics processing unit instance to operate on the pre-processed assessment data to determine at least one estimated item parameter value corresponding to the at least one assessment item based on the pre-processed assessment data and a modified two-parameter item response theory model, to verify the at least one estimated item parameter value, and to cause the at least one estimated item parameter value to be output by the at least one workflow manager server. The target data store server may be in electronic communication with the at least one workflow manager server via the at least one electronic communication network. The target data store server may receive the at least one estimated item parameter value output by the at least one workflow manager server. The at least one target database may store the at least one estimated item parameter value.

In some embodiments, the at least one estimated item parameter value may include a difficulty value, a discrimination value, and a hint change value. To cause the general purpose graphics processing unit instance to determine the at least one estimated item parameter value based on the pre-processed assessment data and the modified two-parameter item response theory model. The one or more worker modules may be further configured to cause the general purpose graphics processing unit instance to perform maximum likelihood estimation of the modified two-parameter item response theory model based on the pre-processed assessment data to determine the difficulty value, the discrimination value, and the hint change value. The assessment data may include a plurality of entries, a given entry of the plurality of entries comprising a user identifier that identifies a responder, an assessment item identifier that identifies an assessment item, a grade for a response submitted to the assessment item by the responder, and a hint usage value. The hint change value may be an estimate of an effect of hint usage on the difficulty value of the at least one assessment item.

In an example embodiment, a system may include a computer processor, a computer memory configured to store computer-readable instructions which, when executed by the computer processor, cause the computer processor to retrieve assessment data from a source database, the assessment data corresponding to a plurality of titles, the plurality of titles each including a plurality of digital assessments, and the plurality of digital assessments each including a plurality of assessment items, initiate at least one general purpose graphics processing unit instance, with the at least one general purpose graphics processing unit instance, determine at least one estimated item parameter value of at least one assessment item of the plurality of assessment items based on the assessment data and a modified two-parameter item response theory model, with the at least one general purpose graphics processing unit instance, performing verification of the at least one estimated item parameter value, and cause the at least one estimated item parameter value to be stored in a target database.

In some embodiments, the assessment data may include a plurality of entries, a given entry of the plurality of entries comprising a user identification for a responder, an assessment item identifier that identifies an assessment item, a grade for a response to the assessment item submitted by the responder, and a hint usage value. The hint usage value may indicate whether a hint is used prior to responding to a corresponding assessment item. The at least one estimated item parameter value of the at least one assessment item is determined by iterative application of a gradient descent optimization algorithm and a loss function. The at least one estimated item parameter value may include a difficulty value, a discrimination value, and a hint change value for the at least one assessment item. The loss function for the at least one assessment item may include a sum of a cross entropy component, an ability mean component, and an ability standard deviation component.

In some embodiments, the cross entropy component may include cross entropy loss between a set of correct first response probability values and corresponding grades of the pre-processed assessment data. The ability mean component may include an absolute value of a mean of estimated ability values for all responders of a corresponding title of the plurality of titles. The ability standard deviation component comprises an absolute value of a standard deviation of the estimated ability values for all responders of the corresponding title.

In some embodiments, the computer-readable instructions further cause the computer processor to perform verification of the at least one estimated item parameter value by calculating a set of correct first response probability values based on the at least one estimated item parameter and calculating cross entropy loss and mean squared error between each value of the set of correct first response probability values and corresponding grades of the pre-processed assessment data.

In some embodiments, the at least one general purpose graphics processing unit instance may include a first general purpose graphics processing unit instance configured to estimate first difficulty values, first discrimination values, and first hint change values for all assessment items of a first title of the plurality of titles based on the assessment data and the modified two-parameter item response theory model, and a second general purpose graphics processing unit instance configured to estimate second difficulty values, second discrimination values, and second hint change values for all assessment items of a second title of the plurality of titles based on the assessment data and the modified two-parameter item response theory model. The first and second general purpose graphics processing unit instances may be configured to operate in parallel.

13. In an example embodiment, a method may include, with a processor, retrieving assessment data from a source database, the assessment data corresponding to a first title and a second title, the first comprising a first plurality of digital assessments, the first plurality of digital assessments comprising a first plurality of assessment items, the second title comprising a second plurality of digital assessments, the second plurality of digital assessments comprising a second plurality of assessment items. The method may further include, with a first general purpose graphics processing unit instance, estimating first item parameter values for each of the first plurality of assessment items based on the assessment data and a modified two-parameter item response theory model. The method may further include, with a second general purpose graphics processing unit instance, estimating second item parameter values for each of the second plurality of assessment items based on the assessment data and the modified two-parameter item response theory model, wherein the first general purpose graphics processing unit instance and the second general purpose graphics processing unit instance estimate the first item parameter values and the second item parameter values in parallel, the method may further include, with the processor, causing the estimated first item parameter values and the estimated second item parameter values to be stored in a target database.

In some embodiments, the assessment data may include a plurality of entries, a given entry of the plurality of entries comprising a user identification for a responder, an assessment item identifier that identifies an assessment item, a grade for a response to the assessment item submitted by the responder, and a hint usage value. The hint usage value may indicate whether a hint is used prior to responding to a corresponding assessment item.

In some embodiments, estimating the first item parameter values for each of the first plurality of assessment items based on the assessment data and the modified two-parameter item response theory model may include iteratively applying a gradient descent optimization algorithm and a loss function to estimate the first item parameter values.

In some embodiments, for a given assessment item of the plurality of assessment items, the estimated first item parameter values may include a difficulty value, a discrimination value, and a hint change value. The difficulty value is an estimate of difficulty of the given assessment item. The discrimination value is an estimate of how well the given assessment item can discriminate between responders having different abilities. The hint change value is an estimate of how the difficulty of the given assessment item is effected by hint usage.

In some embodiments, the modified two-parameter item response theory model determines an estimated correct first response probability value for the given assessment item based on the difficulty value, the discrimination value, the hint change value, an estimated ability value of a responder that is an estimate of a latent ability of the responder, and a hint usage value that indicates whether the responder used a hint prior to responding to the given assessment item.

In some embodiments, the method may further include performing verification of a subset of the estimated first item parameter values that correspond to the given assessment item by calculating a set of correct first response probability values using the modified two-parameter item response theory model based on at least the difficulty value, the discrimination value, and the hint change value, and calculating cross entropy loss and mean squared error between each value of the set of correct first response probability values and corresponding grades of the assessment data.

In some embodiments, the method may further include initiating a workflow manager module, with a supervisory module of the workflow manager module, initiating the first and second general purpose graphics processing unit instances, with an extraction module of the workflow manager module, extracting the assessment data from the source database, with the extraction module, pre-processing the assessment data to divide the assessment data into first and second batches, wherein the first batch corresponds to the first title, and the second batch corresponds to the second title, with a first worker module of the workflow manager module, causing the first general purpose graphics processing unit instance to estimate the first item parameter values based on the first batch, and with a second worker module of the workflow manager module, causing the second general purpose graphics processing unit instance to estimate the second item parameter values based on the second batch.

The above features and advantages of the present invention will be better understood from the following detailed description taken in conjunction with the accompanying drawings.

DETAILED DESCRIPTION

Figure 1:
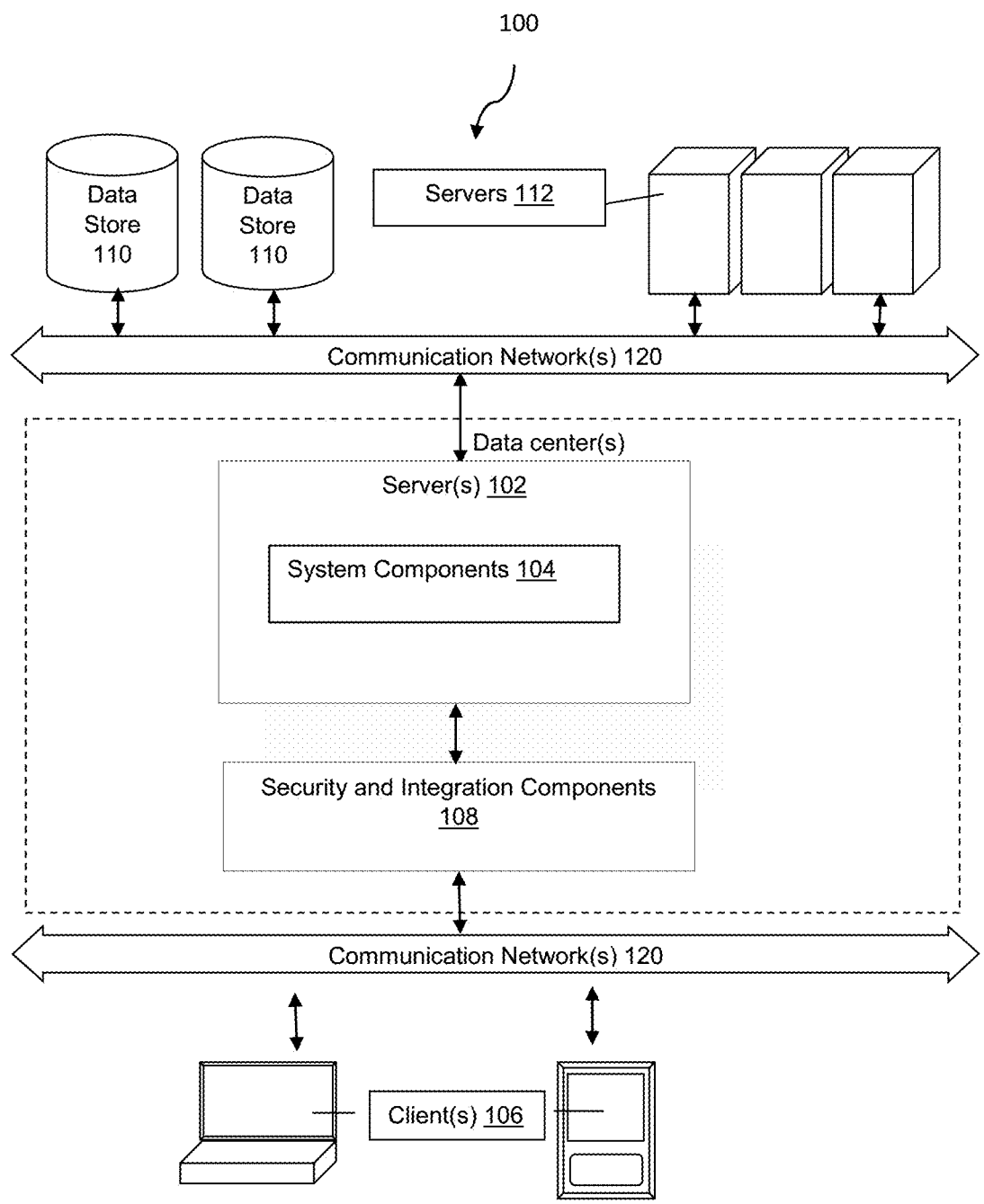
FIG. 1 illustrates a system level block diagram showing one or more data stores, data centers, servers, and clients of a distributed computing environment, in accordance with an embodiment.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 illustrates a non-limiting example of a distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Figure 2:
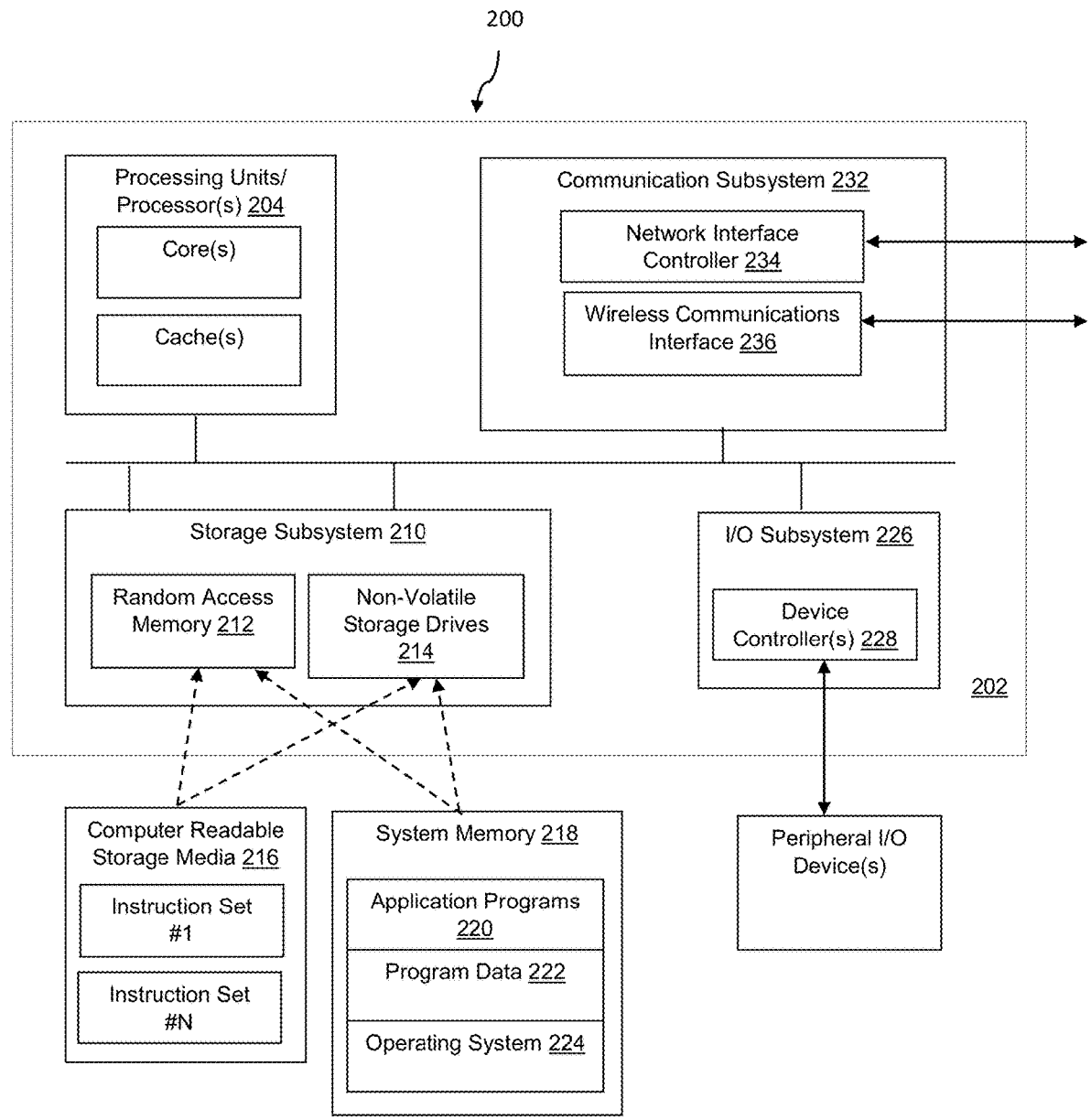
FIG. 2 illustrates a system level block diagram showing physical and logical components of a special-purpose computer device within a distributed computing environment, in accordance with an embodiment.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, general purpose graphics processing units (GPGPUs), and/or other processors).

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

The various physical components of the communications subsystem 232 may be detachable components coupled to the computer system 200 via a computer network, a Fire-Wire® bus, or the like, and/or may be physically integrated onto a motherboard of the computer system 200. Communications subsystem 232 also may be implemented in whole or in part by software.

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 3:
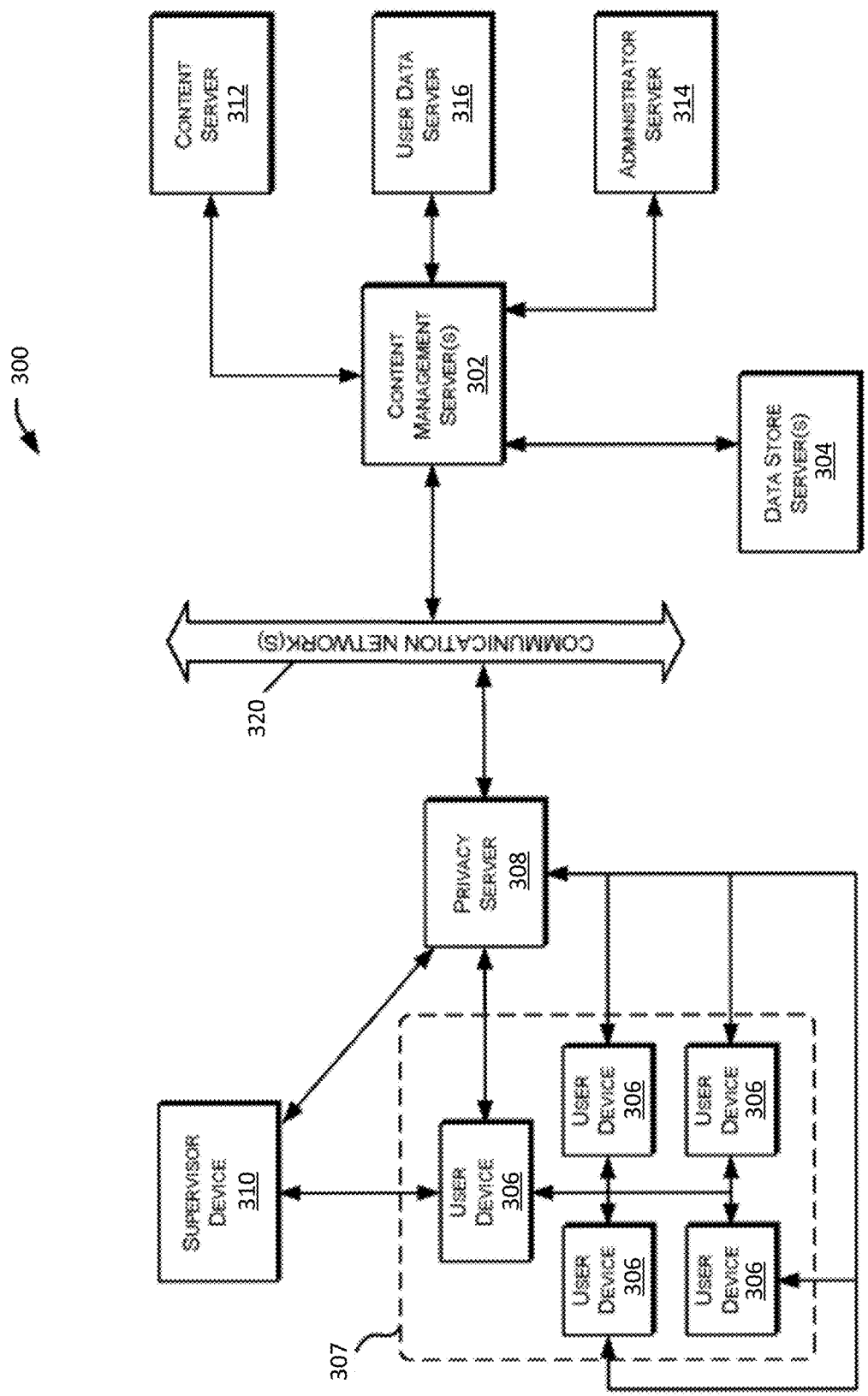
FIG. 3 illustrates a block diagram of an example content distribution network, in accordance with an embodiment.

With reference now to FIG. 3, a block diagram is shown illustrating various components of a content distribution network (CDN) 300 which implements and supports certain embodiments and features described herein. In some embodiments, the content distribution network 300 may include one or several physical components and/or one or several virtual components such as, for example, one or several cloud computing components. In some embodiments, the content distribution network 300 may include a mixture of physical and cloud computing components.

Content distribution network 300 may include one or more content management servers 302. Content management servers 302 may include any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. For example, the content management servers 302 may correspond to the computer server 102 of FIG. 1. Content management server 302 may include one or more server farms, clusters, or any other appropriate arrangement and/or combination or computer servers. Content management server 302 may act according to stored instructions located in a storage subsystem (e.g., storage subsystem 210 of FIG. 2) of the server 302, and may run an operating system, including any commercially available server operating system and/or any other operating systems discussed herein.

The content distribution network 300 may include one or more data store servers 304, such as database servers and file-based storage systems. The data store servers 304 can access data that can be stored on a variety of hardware components.

Data store servers 304 may comprise stored data relevant to the functions of the content distribution network 300. In some embodiments, multiple data stores may reside on a single server 304, either using the same storage components of server 304 or using different physical storage components to assure data security and integrity between data stores. In other embodiments, each data store may have a separate dedicated data store server 304.

Content distribution network 300 also may include one or more user devices 306 and/or supervisor devices 310. User devices 306 and supervisor devices 310 may display content received via the content distribution network 300, and may support various types of user interactions with the content. User devices 306 and supervisor devices 310 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 306 and supervisor devices 310 may be general purpose personal computers or special-purpose computing devices including, by way of example, personal computers, laptop computers, workstation computers, projection devices, and interactive room display systems. Additionally, user devices 306 and supervisor devices 310 may be any other electronic devices, such as a thin-client computers, an Internet-enabled gaming systems, business or home appliances, and/or a personal messaging devices, capable of communicating over network(s) 320.

In different contexts of content distribution networks 300, user devices 306 and supervisor devices 310 may correspond to different types of specialized devices, for example, student devices and teacher devices in an educational network, employee devices and presentation devices in a company network, different gaming devices in a gaming network, clinician/teacher devices and patient/student devices in a clinical diagnosis or learning classification network, etc. Additionally, different user devices 306 and supervisor devices 310 may be assigned different designated roles, such as presenter devices, teacher devices, clinician devices, administrator devices, or the like, and in such cases the different devices may be provided with additional hardware and/or software components to provide content and support user capabilities not available to the other devices.

The content distribution network 300 also may include a privacy server 308 that maintains private user information at the privacy server 308 while using applications or services hosted on other servers. For example, the privacy server 308 may be used to maintain private data of a user within one jurisdiction even though the user is accessing an application hosted on a server (e.g., the content management server 302) located outside the jurisdiction. In such cases, the privacy server 308 may intercept communications between a user device 306 or supervisor device 310 and other devices that include private user information. The privacy server 308 may create a token or identifier that does not disclose the private information and may use the token or identifier when communicating with the other servers and systems, instead of using the user's private information.

The content distribution network 300 may include one or more communication networks 320. Although only a single network 320 is identified in FIG. 3, the content distribution network 300 may include any number of different communication networks between any of the computer servers and devices shown in FIG. 3 and/or other devices described herein. Communication networks 320 may enable communication between the various computing devices, servers, and other components of the content distribution network 300. Various implementations of content distribution networks 300 may employ different types of networks 320, for example, computer networks, telecommunications networks, wireless networks, and/or any combination of these and/or other networks.

As illustrated in FIG. 3, the content management server 302 may be in communication with one or more additional servers, such as a content server 312, an administrator server 314, and/or a user data server 316. Each of these servers may include some or all of the same physical and logical components as the content management server(s) 302, and in some cases, the hardware and software components of these servers 312-316 may be incorporated into the content management server(s) 302, rather than being implemented as separate computer servers.

Content server 312 may include hardware and software components to generate, store, and maintain the content resources for distribution to user devices 306 and other devices in the network 300. For example, in content distribution networks 300 used for professional training and educational purposes, or clinical diagnosis of students/patents, the content server 312 may include data stores of training materials, presentations, plans, syllabi, reviews, evaluations, interactive programs and simulations, course models, course outlines, assessments and diagnostic modules, and various training interfaces that correspond to different materials and/or different types of user devices 306.

Administrator server 314 may include hardware and software components to initiate various administrative functions at the content management server 302 and other components within the content distribution network 300. For example, the administrator server 314 may monitor device status and performance for the various servers, data stores, and/or user devices 306 in the content distribution network 300. When necessary, the administrator server 314 may add or remove devices from the network 300, and perform device maintenance such as providing software updates to the devices in the network 300. Various administrative tools on the administrator server 314 may allow authorized users to set user access permissions to various content resources, monitor resource usage by users and devices 306, and perform analyses and generate reports on specific network users and/or devices (e.g., resource usage tracking reports, training evaluations, etc.).

User data server 316 may include hardware and software components that store and process data for multiple users relating to each user's activities and usage of the content distribution network 300. For example, the content management server 302 may record and track each user's system usage, including their user device 306, content resources accessed, and interactions with other user devices 306. This data may be stored and processed by the user data server 316, to support user tracking and analysis features. For instance, in the contexts of professional training, education, and/or clinical diagnosis of students or patients, the user data server 316 may store and analyze digital assessments completed by each user or training materials viewed, presentations attended, courses or tests completed, the user's responses to assessment items of the digital assessments or other interactions, assessment or evaluation results, and the like. Individual digital assessments may be included as part of a title, which may correspond to a particular course or textbook for a particular subject. A title may include multiple digital assessments, which may be organized into chapters, which may be organized into sections. Each digital assessment may include a number of assessment items to which users may interact with and submit responses to.

For example, when a user (sometimes referred to herein in this context as a responder) completely or partially completes a digital assessment, the responses to each of the assessment items of the digital assessment that are responded to by the user may be stored in the user data server 316 (e.g., as response data). It should be understood that the methods described herein by which response data and corresponding user and assessment identifier information are stored are intended to be illustrative and not limiting. If desired, alternative organizational data storage paradigms may be used. As used herein, an "assessment item" refers to the smallest measurable part of any activity with built-in assessment (e.g., a tutorial, a formative, summative, or diagnostic test or quiz, or any other applicable activity). Assessment items may include, for example, selected response items (e.g., multiple-choice or true-or-false questions), and/or constructed response items (e.g., fill in the blank questions). The user data server 316 may then analyze the responses and generate grades for the responses corresponding to whether each response is correct (in which case a grade of "1" is generated) or incorrect (in which case a grade of "0" is generated). The generated grades may be stored in the data server 316. In some embodiments, assessment items may provide a user with the option of accessing a hint before responding to the assessment item. For each response stored in the data server 316, a corresponding hint usage value may also be stored (e.g., in a corresponding data entry), which may be used to indicate whether the user accessed a hint before responding to the corresponding assessment item. For example, a hint usage value of 1 indicates that a hint was accessed by the user when responding to the corresponding assessment item, while a hint usage value of 0 indicates that a hint was not accessed.

In some embodiments, the data store servers 304 may store assessment data corresponding to one or more digital assessments of one or more titles. For a given digital assessment, a corresponding subset of the assessment data stored in the data store servers 304 may include responses, grades, hint usage values, and responder (i.e., user) information (e.g., including user identifiers) for each assessment item of that digital assessment. For example, the portion of the assessment data corresponding to a given assessment item (which may sometimes be referred to as the assessment item data for that assessment item) may include a dataset (e.g., a look-up table (LUT)) of responders that have responded to the assessment item. Each entry of the dataset may correspond to a different responder and may include the user ID of the responder, an assessment item identifier from which the assessment item, assessment, section, chapter, and title of the corresponding assessment item may be determined, a grade for the response (e.g., 1 for a correct answer and 0 for an incorrect answer), and a hint usage value for the response (e.g., 1 if a hint was used and 0 if a hint was not used). As will now be described, the assessment data stored in the data store servers 304 may be used as a basis for estimating the latent abilities of users represented in the assessment data, and for estimating the quality of assessment items included in the digital assessment corresponding to the assessment data using, for example, an item response theory (IRT) model and maximum likelihood estimation (MLE).

IRT is a technique for evaluating the latent abilities of responders (e.g., which may be quantified as individual ability values) to a digital assessment through their performance on assessment items of the digital assessment. The IRT model allows the quality of each assessment item of a digital assessment to be individually evaluated and quantified. For example, if responders tend to perform poorly on an assessment item that was intended by its authors to be easy, then the assessment item may be too difficult and should be redesigned.

In an embodiment, a two-parameter logistic item response (2PL IRT) model may be used to estimate assessment item parameters. The basic 2PL IRT model estimates the values of two parameters (i.e., properties) of an assessment item. For example, the 2PL IRT model may be used to estimate the difficulty and discrimination (e.g., which may be quantified by a difficulty value and a discrimination value, respectively) of each assessment item of a digital assessment. In some embodiments, a modified 2PL model may be used, which, in addition to estimating assessment item difficulty and discrimination values, may estimate a hint change value that is indicative of the impact that using hints has on the probability of a responder submitting a correct first response to the assessment item. In addition to user/responder identifiers, assessment item identifiers, and grades, the modified 2PL IRT model may also take hint usage values as inputs, which may indicate whether a particular responder used a hint before responding to the assessment item. An example modified 2PL IRT model may take the following form:

$$P(Y=1) = \frac{1}{1 + \exp(-\eta)} \quad \text{(Eq. 1)}$$

$$\eta = D_1 \cdot A - D_2 - \text{hint}_{change} \cdot \text{hint}_{usage} \quad \text{(Eq. 2)}$$

where P(Y=1) is the probability of a responder correctly responding to the assessment item on their first attempt (sometimes referred to herein as the correct first response probability value), $D_1$ is the discrimination value of the assessment item, A is the ability value of the responder, $D_2$ is the difficulty value of the assessment item, $\text{hint}_{change}$ is the hint change value indicating an expected shift in difficulty of the assessment item expected as a result of the responder using a hint before responding to the assessment item, and $\text{hint}_{usage}$ is the hint usage value with a hint usage value of 1 indicating that a hint was used by the responder and a hint usage value of 0 indicating that a hint was not used by the responder. It should be noted that a positive hint change value indicates that the use of a hint decreases the chance of a correct response, hint change value of zero indicates that the use of a hint has no influence on the chance of a correct response, and negative hint change value means the hint increases the chance of a correct response. As will be described, optimization (e.g., using MLE via a gradient descent optimization algorithm) based on the modified 2PL IRT model of Eqs. 1 and 2 may be performed by one or more processors (e.g., processors 204 of FIG. 2, which may include one or more general purpose graphics processing units) of one or more computer systems (e.g., computer system 200 of FIG. 2) based on assessment data collected from a sample population of responders in order to determine the difficulty value, the discrimination value, and the hint change value of each assessment item of each digital assessment a title, and to generate ability values for each responder of the sample population. It should be noted that the sample population of responders may be limited to responders and corresponding response data and/or assessment data for a single title. Assessment data for different titles may have different sample populations of responders.

Figure 7:
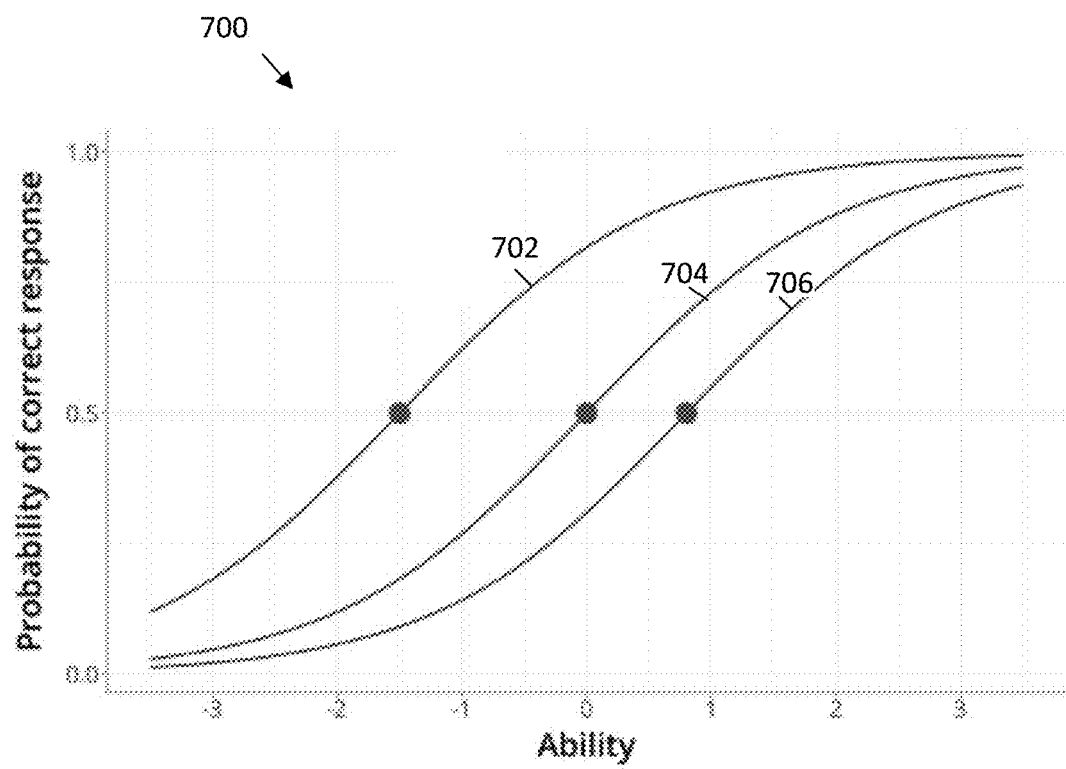
FIG. 7 illustrates a chart showing three different item characteristic curves, each corresponding to different levels of assessment item difficulty, in accordance with an embodiment.

As used herein, the difficulty value for an assessment item is quantified as the ability value at which a responder is estimated to have a 50% probability of answering the assessment item correctly on their first attempt (i.e., the initial correct response probability for the responder with respect to the assessment item). For example, a difficulty value of 0 indicates that a responder having an ability value of 0 is estimated to have a 50% chance of responding correctly to the assessment item. An assessment item with a difficulty value of 1 is considered to be more difficult than an assessment item with a difficulty value of 0. An assessment item with a difficulty value of −1 is considered to be less difficult than an assessment item with a difficulty value of 0. FIG. 7 shows a chart 700 of responder ability value vs.

the probability of a correct response be selected by the responder on their first attempt. The chart 700 includes item characteristic curves 702, 704, and 706 representing three assessment items having different difficulties values. Item characteristic curves referred to herein are used to show the estimated probability of a responder answering an assessment item correctly on their first attempt, given the ability value of the responder, and are a visual representation of an IRT model that has been determined for the assessment item, as will be described. As shown, the curve 702 has a difficulty value of around −1.5, the curve 704 has a difficulty value of around 0, and the curve 706 has a difficulty value of about 0.8. Comparatively, this indicates that the assessment item represented by the curve 702 is estimated to be less difficult than both assessment items represented by the curves 704 and 706, and that the assessment item represented by the curve 704 is estimated to be less difficult than the assessment item represented by the curve 706.

Figure 8:
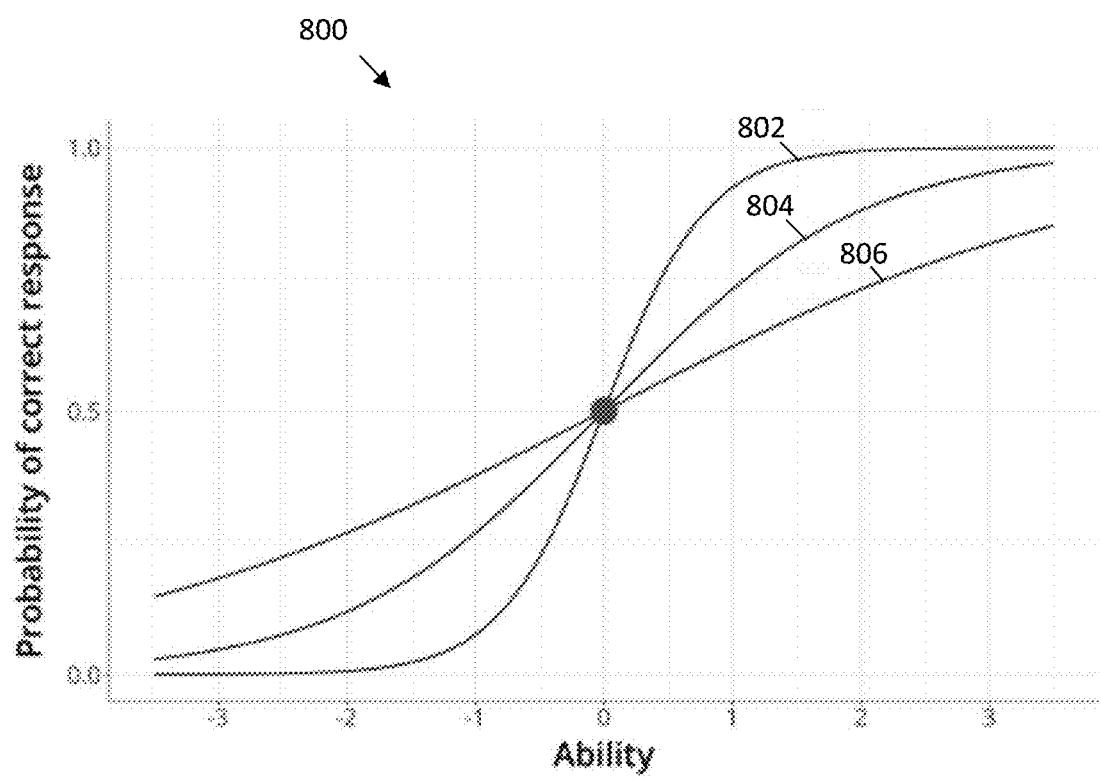
FIG. 8 illustrates a chart showing three different item characteristic curves, each corresponding to different levels of assessment item discrimination, in accordance with an embodiment.

As used herein, the discrimination value for an assessment item describes how well the assessment item can differentiate between responders having different ability values. For example, the discrimination value of a given assessment item may be quantified as the local rate of change of a corresponding item characteristic curve at a midpoint of the item characteristic curve (e.g., corresponding to a 50% probability of a responder providing a correct response to the assessment item on their first attempt). A lower discrimination value may indicate that the assessment item is less likely to discriminate between learners of different ability levels compared to a desired (e.g., predetermined rate). As shown in FIG. 8, a chart 800 includes item characteristic curves 802, 804, and 806. Curve 802 corresponds to an assessment item having a relatively high discrimination value, as the probability of responding correctly to that assessment item increases rapidly (e.g., the curve has a relatively high rate of change) as responder ability increases. For example, learners with an ability value of −1 have a much lower estimated probability of responding to the assessment item represented by the curve 802 correctly (about 10%) compared to that of learners with an ability value of 1 (about 90%). Curve 804 corresponds to an assessment item having a relatively moderate discrimination value. Curve 806 corresponds to an assessment item having a relatively low discrimination value, with the relationship between ability and the probability of responding correctly to the assessment item being flatter (e.g., having a smaller positive rate of change) around the midpoint of the item characteristic curve. For example, learners with an ability value of −1 have a similar estimated probability of responding to the assessment item represented by the curve 806 correctly (about 40%) compared to that of learners with an ability value of 1 (about 60%).

The process of estimating responders' latent ability and estimating IRT model parameters for assessment items of a given digital assessment, as described above, may be managed via a workflow manager module executed by a processor of one or more of the data store servers 304.

Figure 4:
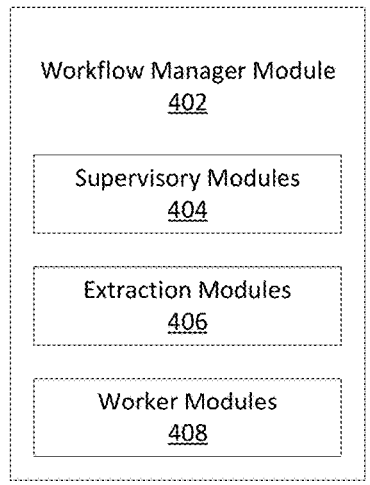
FIG. 4 illustrates a workflow manager module that may be executed by a processor of a computer device within a distributed computing environment, in accordance with an embodiment.

FIG. 4 shows a workflow manager module 402 that may be executed by one or more processors (e.g., processors 204 of FIG. 2) of one or more computer systems (e.g., servers 102, 112, 304 FIGS. 1, 3), and that manages the process of estimating IRT model parameters for assessment items of a digital assessment. The workflow manager module 402 may include supervisory modules 404, extraction modules 406, and worker modules 408. A computer system that includes a processor that executes at least a portion of the workflow manager module 402 may be referred to as a workflow manager server.

The supervisory modules 404 supervise the entire processing workflow when processing assessment data for digital assessments of a title to determine ability values of responders and assessment item parameters for the modified 2PL IRT model. For example, the supervisory modules 404 may control the execution the worker modules 408, as needed. The supervisory modules 404 may also automatically initiate general process graphics processing unit (GPGPU) instances that may be used to process the assessment data, as needed, and may automatically stop GPGPU instances once modelling has ended. These GPGPU instances may, for example, be implemented using one or more physical graphics processing units (GPUs) (e.g., GPGPUs of the processing units 204 of FIG. 2). In some embodiments, these physical GPUs may be system components (e.g., system components 104 of FIG. 1) of one or more data center servers (e.g., servers 102 of FIG. 1). The computer systems executing the workflow manager module 402 may include these data center servers or may be connected to these data center servers via one or more communications networks (e.g., communications networks 120, 320, FIGS. 1, 3).

Figure 5:
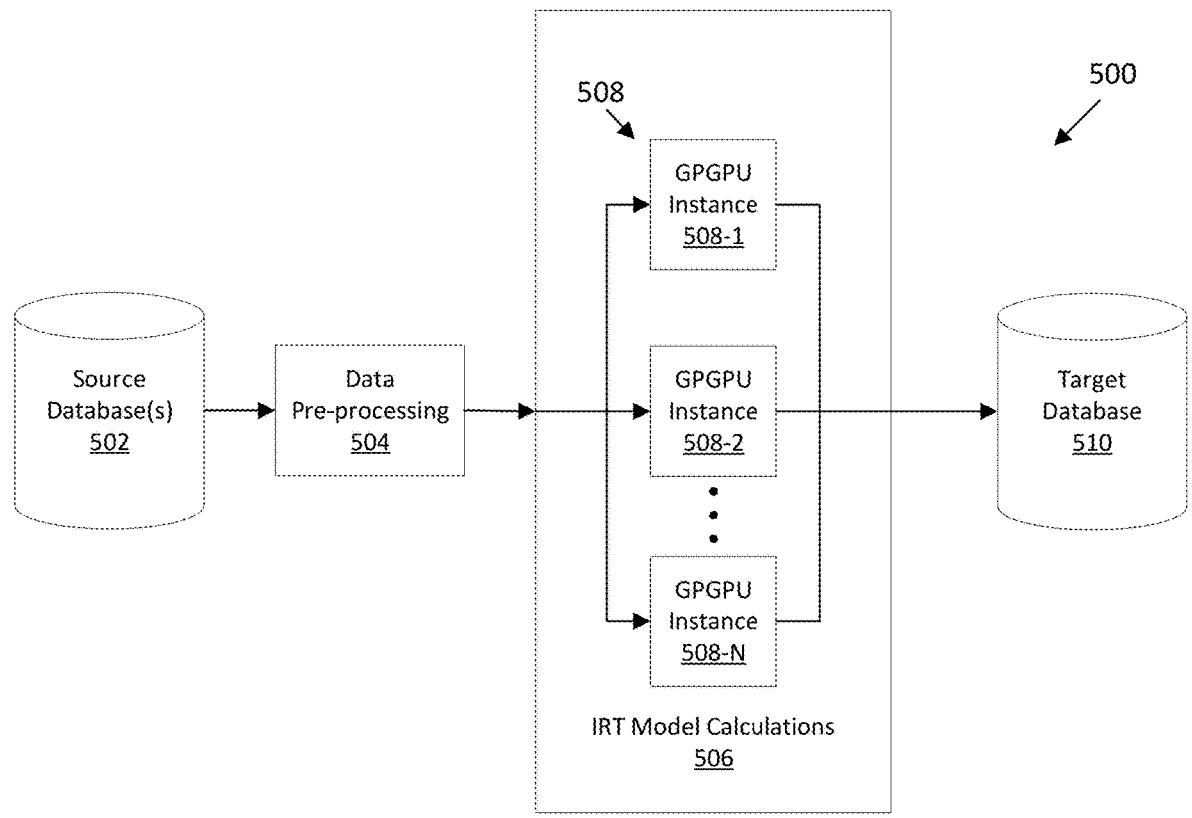
FIG. 5 illustrates a conceptual block diagram showing the flow of data during IRT modelling of digital assessment data, in accordance with an embodiment.

The extraction modules 406 may be controlled by the workflow manager 402 and may extract assessment data corresponding to the digital assessment from one or more source databases (e.g., source database 502 of FIG. 5). The source databases may, for example, be stored on one or more computer memory devices of one or more source data store servers (e.g., data store servers 304 of FIG. 3), which may be connected in electronic communication with the server or servers that include the processor or processors executing the workflow manager module 402 via one or more electronic communication networks (e.g., communication networks 120, 320, FIGS. 1, 3). The extraction modules 406 may pre-process the assessment data to transform the assessment data into a desired format, filter out unwanted data points, and separate the assessment data into batches for parallel processing, for example. For example, assessment data that has been pre-processed in preparation for IRT modelling may include only response data that includes responders' first attempts at responding to assessment items of the corresponding digital assessment.

The worker modules 408 may apply dataflow programming methods running on the GPGPU instances initiated by the supervisory modules 404 to estimate responder ability values and estimate assessment item parameter values (e.g., difficulty value, discrimination value and hint change value) according to a modified 2PL IRT model for each assessment item of the digital assessment, and may cause the estimated ability values and estimated assessment item parameters to be stored in one or more target databases (e.g., target database 510 of FIG. 5). In an embodiment, the estimated ability values may be stored in a different database from the database in which the estimated assessment item parameters are stored. In some embodiments, each GPGPU instance may process a separate batch of the pre-processed assessment data (e.g., with each batch of assessment data corresponding to a different individual title), as defined during pre-processing by the extraction modules 406 so that the assessment data of multiple titles may be processed and modelled in parallel. The target databases may, for example, be stored on one or more computer memory devices of one or more target data store servers (e.g., data store servers 304 of FIG. 3), which may be connected in electronic communication with the server or servers that include the processor or processors executing the workflow manager module 402 via one or more electronic communication networks (e.g., communication networks 120, 320, FIGS. 1, 3).

FIG. 5 shows a block diagram illustrating dataflow architecture 500 of assessment data for a digital assessment that undergoes processing (including IRT modelling) to determine assessment item parameters for each assessment item of the digital assessment. Some aspects of the dataflow architecture 500 will be described in the context of the workflow manager module 402 of FIG. 4. One or more source databases 502 (e.g., stored on one or more computer memory devices of one or more source data store servers of the data store servers 304, FIG. 3) may store assessment data corresponding to a digital assessment. The source database(s) 502 may be in electronic communication with the computer system(s) executing the workflow manager module 402 via one or more communications networks (e.g., communication networks 120, 320, FIGS. 1, 3).

The assessment data may include multiple entries. Each entry may include, a user identifier that identifies the responder that submitted a response corresponding to that entry, an assessment item identifier that identifies the assessment item corresponding to that entry, a grade for the response submitted by the responder (e.g., 1 if the response is correct and 0 if the response is incorrect), and a hint usage value. For example, the assessment item identifier may allow the title, chapter, section, assessment, and assessment item corresponding to a given entry to be identified. The assessment data may include entries corresponding to multiple titles, each including multiple digital assessments. The extraction modules 406 may retrieve the assessment data from the source database(s) 502 (e.g., in response to instructions received from the supervisory modules 404) before proceeding to a data pre-processing block 504.

At the data pre-processing block 504, the extraction modules 406 may transform the assessment data into a desired format, filter unwanted data points out of the assessment data, and/or divide the assessment data into batches for parallel processing, for example. In some embodiments the dataset entries for responders who were "test users" (e.g., corresponding to a test user account that is not associated with an actual student) or responses from instructor/teacher user accounts are omitted from the pre-processed assessment data used in the IRT modelling, as such data may cause inaccuracy in estimation. Assessment items from digital assessments and/or titles that have a number of unique responders that do not exceed a predetermined threshold may be omitted from the pre-processed assessment data (e.g., as a large responder sample size may generally be desirable for accuracy of item parameter estimation). Additionally, all assessment data that does not correspond to responders' first attempts at responding to the corresponding assessment item may be omitted from the pre-processed assessment data prior to IRT modelling. In this way, difficulty and discrimination values will be estimated based only on responders' first attempts.

As with the assessment data initially retrieved from the source database(s) 502, the pre-processed assessment data may include multiple entries, each entry including a user identifier, an assessment item identifier, a grade, and a hint usage value. In some embodiments, each entry of the pre-processed assessment data may also include an indicator for whether a hint is available for the assessment item corresponding to that entry. The pre-processed assessment data may be separated into batches, with each batch including a dataset corresponding to a particular title that may include multiple digital assessments and the assessment items included in those digital assessments. Each batch of pre-processed assessment data may undergo IRT modelling separately at block 506 (e.g., may be processed by a different one of GPGPU instances 508).

At IRT model calculation block 506, the worker modules 408 may operate on the pre-processed assessment data using GPGPU instances 508 to estimate item parameter values (e.g., difficulty values, discrimination values, and hint change values) for each assessment item represented in the pre-processed assessment data and to estimate ability values for each responder represented in the pre-processed assessment data based on a modified 2PL IRT model (e.g., according to Eqs. 1 and 2). It should be understood that IRT model calculation may be performed on a title-by-title basis, with each worker module 408 and GPGPU instance 508 generating estimated item parameters and estimated ability scores corresponding to only one respective title at any given time. For example, the worker modules 408 may use dataflow programming methods/paradigms (e.g., using an application programming interface such as TensorFlow) and perform MLE for the 2PL IRT model using respective subsets of the pre-processed assessment data corresponding to each assessment item. In some embodiments the block 506, when performing MLE for a given assessment item, may take the grade of each response, the user identifier of each responder, and the hint usage values as inputs, and may output a difficulty value, a discrimination value and hint change value for the assessment item and ability values for each responder represented in the portion of the pre-processed assessment data that corresponds to the assessment item. The outputs may maximize the likelihood function of the modified 2PL IRT Model and may attempt to minimize the loss function, as will be described. Calculations related to the performance of MLE for multiple batches of assessment data, each batch corresponding to a respectively different individual title may be processed in parallel using the GPGPU instances 508, which may be initiated by the supervisory modules 404.

In an embodiment, at block 506 a gradient descent optimization algorithm (e.g., the Adaptive Moment Estimation (Adam) optimizer) may be used in combination with a loss function to perform MLE to estimate the item parameters of each assessment item. The gradient descent optimization algorithm may be iteratively performed to repeatedly estimate the item parameters to minimize the loss function (e.g., until a predetermined number of iterations have been determined or until the change in the output of the loss function for successive iterations is determined to have fallen below a predetermined threshold). For example, the loss function may be the sum of a cross entropy component, an ability mean component, and an ability standard deviation component. The cross entropy component may be a cross entropy loss between observed grades (e.g., corresponding grades of the pre-processed assessment data) and correct first response probability values calculated based on the estimated item parameter values (sometimes referred to herein as a cross entropy component). The ability mean component may be the absolute value of the mean estimated ability value for all responders represented in the pre-processed assessment data for a corresponding title. The ability standard deviation component may be the absolute value of the standard deviation of the ability value for all responders represented in the pre-processed assessment data for the corresponding title minus one. In some embodiments, the ability mean loss component and the ability standard deviation loss component may each be multiplied by a fractional value (e.g., 0.01)

so that the weights of the ability mean loss and ability standard deviation loss components of the loss function are less than that of the cross-entropy component. In order to initially estimate the correct first response probability, initial estimated item parameters (e.g., difficulty value, discrimination value, hint change value) of each assessment item may be randomly chosen from normal distributions, and may be subsequently updated via the iterative verification of the estimated item parameters and application of the loss function.

Once the difficulty value, discrimination value and hint change value for each assessment item of digital assessments and titles being processed have been estimated and verified at block 506, the worker modules 408 may output these estimated item parameters in a target database 510 (e.g., stored on one or more computer memory devices of one or more target data store servers of the data store servers 304, FIG. 3). The estimated ability values for the responders that submitted responses to the assessment items of each title may be stored in one or more separate databases. The server or servers in which the target database(s) 510 are stored may be in electronic communication with the computer system(s) executing the workflow manager module 402 via one or more communications networks (e.g., communication networks 120, 320, FIGS. 1, 3).

Figure 6:
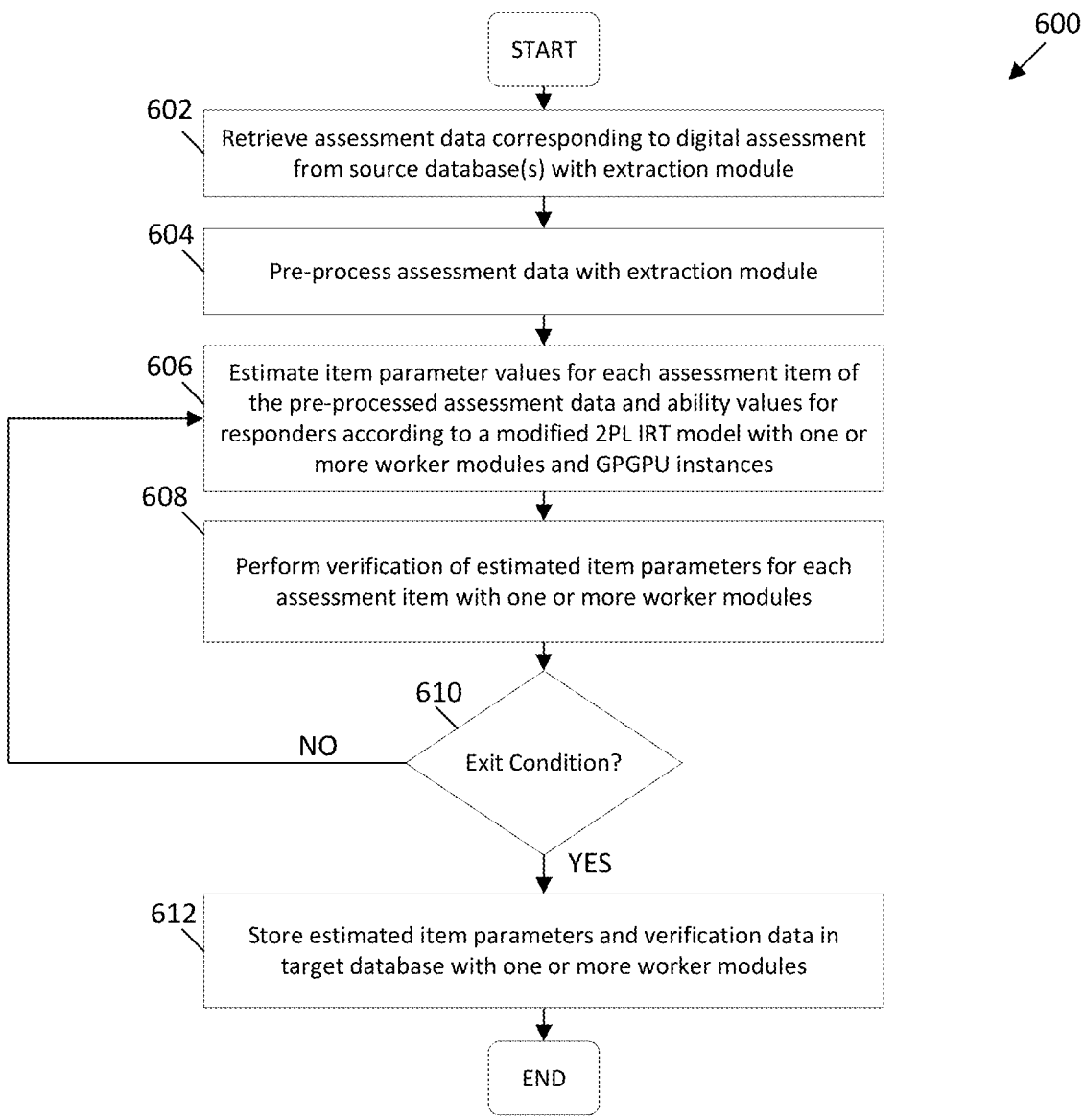
FIG. 6 illustrates a process flow diagram for a method of collecting assessment data, generating item parameter data for the assessment data based on an IRT model, and storing the item parameter data using dataflow programming methods, in accordance with an embodiment.

FIG. 6 shows an illustrative process flow for a method 600 by which assessment item parameters may be determined for digital assessments of a one or more titles based on the modified 2PL IRT model (e.g., according Eqs. 1 and 2). For example, the method 600 may be performed in connection with the data flow architecture of FIG. 5. For example, the steps of the method 600 may be performed by executing computer-readable instructions stored in one or more system memories (e.g., system memory 218, FIG. 2) and/or computer-readable storage media (e.g., computer-readable storage media 216, FIG. 2) using one or more computer processors (e.g., processing units 204, FIG. 2) of one or more computer systems (e.g., computer system 200, FIG. 2).

At step 602, an extraction module (e.g., extraction module 404 of FIG. 404) may retrieve assessment data corresponding to a digital assessment from one or more source databases (e.g., source database 502).

At step 604, the extraction module may pre-process the assessment data to transform the assessment data into a desired format, filter out unwanted data points, and/or divide the assessment data into batches for parallel processing to produce pre-processed assessment data.

At step 606, one or more worker scripts and GPGPU instances may estimate item parameter values for each assessment item of the pre-processed assessment data and estimate ability values for each responder represented in the pre-processed assessment data according to a modified 2PL IRT model (e.g., according to Eqs. 1 and 2) based on a the pre-processed assessment data. For example, a gradient descent optimization algorithm and loss function may be used (e.g., as described in detail in connection with block 506 of FIG. 5) to estimate the item parameters of each assessment item. The estimated item parameters may include a difficulty value, a discrimination value, and a hint change value for each assessment item of the pre-processed assessment data, respectively. Of the estimated ability values determined at step 606, the estimated ability value for a given one the responders may correspond to an estimated latent ability of that responder with respect to a particular title.

By using multiple GPGPU instances operating in parallel to perform MLE for multiple titles (e.g., which may correspond to millions of assessment data entries in some cases), the amount of time required to complete IRT modelling and MLE may be significantly reduced compared to if the process were performed using a single central processing unit (CPU). For example, a set of assessment data that would take around 13 hours to process with a single CPU may only take around 40 minutes when processed with a single GPGPU instance. When processed with multiple GPGPU instances process the assessment data in parallel, the processing time required may decrease according to the number of GPGPU instances used. In an embodiment, each GPGPU instance may estimate item parameters for assessment items of a respectively different individual title (e.g., such that a single GPGPU does not processes assessment data corresponding to multiple titles).

At step 608, the estimated item parameter values produced at step 606 may undergo verification. For example, for a given assessment item, the estimated item parameters and estimated ability values for each responder produced at step 606 may be input for their corresponding variables of the modified 2PL IRT model, from which a set of correct first response probability values may be calculated. Each correct first response probability value of the set may correspond to a different pre-processed assessment data entry that corresponds to the given assessment item (e.g., such that each respective correct first responder probability value of the set corresponds to a different observed grade corresponding to the given assessment item).

For each correct first response probability value of the set, a cross entropy loss may be calculated between that correct first response probability value (e.g., a value between 0 and 1) and the observed grade (e.g., a value of 0 for an incorrect response or a value of 1 for a correct response) of the corresponding entry. Different baselines (e.g., cross entropy loss baselines) may be established by calculating cross entropy loss between each individual observed grade that corresponds to the given assessment item and: the average of the observed grades for the given assessment item, the average of the observed grades for all assessment items of an entire title, and/or a value of 0.5.

Additionally or alternatively, for each correct first response probability value of the set, a mean squared error may be calculated between that correct first response probability value (e.g., a value between 0 and 1) and the observed grade (e.g., a value of 0 for an incorrect response or a value of 1 for a correct response) of the corresponding entry. Different baselines (e.g., mean squared error baselines) may be established by calculating mean squared error between each individual observed grade that corresponds to the given assessment item and: the average of the observed grades for the given assessment item, the average of the observed grades for all assessment items of an entire title, and/or a value of 0.5.

Cross entropy losses, cross entropy loss baselines, mean squared errors, and mean squared error baselines may be aggregated at the assessment item level, at the bin level, and at the title level. In some embodiments, the estimated item parameters may be considered a "good fit" when the cross entropy losses and/or mean square errors at a given level of aggregation are less than the corresponding cross entropy loss baselines and mean squared error baselines at that level of aggregation, respectively.

Aggregation at the bin level may be performed by grouping the set of correct first response probability values into a number of bins (e.g., 20 bins) of equal width, determining an average of the correct first response probability values for each respective bin (e.g., to produce estimated average bin values), and determining an average observed grade for each respective bin (e.g., to produce observed average bin values).

In some embodiments, the estimated item parameters may be considered a "good fit" when the cross entropy losses and/or mean square errors are less than the corresponding cross entropy loss baselines and mean squared error baselines, respectively, for each bin. In some embodiments, the estimated item parameters may be considered a "good fit" if a difference between the average correct first response probability and the average observed grade for each bin is below a predetermined threshold (i.e., the average correct first response probability and the average observed grade for each bin are sufficiently close in value). In another embodiment, a "good fit" may be defined as the value of each bin being between boundaries of the bin. For example, when considering a bin with boundaries between 0.55 and 0.6, the average observed grade equals 0.57, this is considered a "good fit." In some embodiments, cross entropy and/or mean squared error may be calculated for each bin and then aggregated to obtain a single cross entropy loss value and/or a single mean squared error value for a title. This aggregation may take into account the different number of observations in each bin.

All verification metrics calculated at step 608 (e.g., including average observed grades, average correct first response probability values, average cross entropy loss and/or mean squared error values, and average cross entropy loss and/or mean squared error baselines) may be stored in the target database with one or more worker modules.

At step 610, the method 600 determines whether an exit condition has occurred. For example, an exit condition may occur when the number of iterations of steps 606 through 610 that have been performed exceeds a predetermined threshold. As another example, an exit condition may occur when the cross entropy losses and/or mean squared errors at different levels of aggregation calculated at step 606 remain substantially unchanged (e.g., having changed by less than a predetermined threshold) between multiple consecutive iterations of steps 606-610. As another example, an exit condition may occur when the estimated item parameters are verified as being a "good fit," at step 608 (e.g., when the cross entropy losses and/or mean squared errors at different levels of aggregation calculated at step 608 are within a predefined acceptable range of values). If an exit condition has not occurred, the method 600 proceeds to step 612. Otherwise, the method 600 returns to step 606 and the item parameter values of each assessment item are estimated again.

At step 612, the worker modules may cause the estimated item parameter values for each assessment item to be stored in at least one target database (e.g., target database 510, FIG. 5) of at least one server that is in communication with the one or more computer systems executing the method 600. In some embodiments, the estimated item parameters produced each iteration of step 606 may be stored in the at least one target database. Additionally, verification data (e.g., including the average bin difference value, the average cross entropy loss value, and/or the mean squared errors) and responder ability data (e.g., including estimated ability values of all responders) may be stored in separate databases of one or more servers, which may include the server or servers on which the estimated item parameter values are stored. It should be understood that while estimated item parameter values and verification data are shown here to be stored in the at least one target database after step 610, in other embodiments, the estimated item parameter values and verification data may be stored in the at least one target database upon being calculated.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising:
a computer processor; and
a computer memory configured to store computer-readable instructions which, when executed by the computer processor, cause the computer processor to:
retrieve assessment data from a source database, the assessment data corresponding to a plurality of titles, the plurality of titles each including a plurality of digital assessments, and the plurality of digital assessments each including a plurality of assessment items;
initiate at least two general purpose graphics processing unit instances, wherein the at least two general purpose graphics processing unit instances comprise:
a first general purpose graphics processing unit instance configured to estimate first difficulty values, first discrimination values, and first hint change values for all assessment items of a first title of the plurality of titles based on the assessment data and a modified two-parameter item response theory model; and
a second general purpose graphics processing unit instance configured to estimate second difficulty values, second discrimination values, and second hint change values for all assessment items of a second title of the plurality of titles based on the assessment data and the modified two-parameter item response theory model, wherein the first and second general purpose graphics processing unit instances are configured to operate in parallel;
with the at least two general purpose graphics processing unit instances, determine at least one estimated item parameter value of at least one assessment item of the plurality of assessment items based on the assessment data and the modified two-parameter item response theory model;
with the at least two general purpose graphics processing unit instances, perform verification of the at least one estimated item parameter value; and
cause the at least one estimated item parameter value to be stored in a target database.

2. The system of claim 1, wherein the assessment data includes a plurality of entries, a given entry of the plurality of entries comprising a user identification for a user responder, an assessment item identifier that identifies an assessment item, a grade for a response to the assessment item submitted by the user responder, and a hint usage value.

3. The system of claim 2, wherein the hint usage value indicates whether a hint is used prior to responding to a corresponding assessment item.

4. The system of claim 2, wherein the at least one estimated item parameter value of the at least one assessment item is determined by iterative application of a gradient descent optimization algorithm and a loss function.

5. The system of claim 4, wherein the at least one estimated item parameter value includes a difficulty value, a discrimination value, and a hint change value for the at least one assessment item.

6. The system of claim 5, wherein the loss function comprises a sum of a cross entropy component, an ability mean component, and an ability standard deviation component.

7. The system of claim 6, wherein the cross entropy component comprises cross entropy loss between a set of correct first response probability values and corresponding grades of the assessment data, wherein the ability mean component comprises an absolute value of a mean of estimated ability values for all user responders of a corresponding title of the plurality of titles, and wherein the ability standard deviation component comprises an absolute value of a standard deviation of the estimated ability values for all user responders of the corresponding title.

8. The system of claim 4, wherein the computer-readable instructions further cause the computer processor to:
   perform verification of the at least one estimated item parameter value by:
      calculating a set of correct first response probability values based on the at least one estimated item parameter; and
      calculating cross entropy loss and mean squared error between each value of the set of correct first response probability values and corresponding grades of the pre-processed assessment data.

9. A method comprising:
   with a processor, retrieving assessment data from a source database, the assessment data corresponding to a first title and a second title, the first title comprising a first plurality of digital assessments, the first plurality of digital assessments comprising a first plurality of assessment items, the second title comprising a second plurality of digital assessments, the second plurality of digital assessments comprising a second plurality of assessment items, wherein the assessment data includes a plurality of entries, a given entry of the plurality of entries comprising a user identification for a user responder, an assessment item identifier that identifies an assessment item, a grade for a response to the assessment item submitted by the user responder, and a hint usage value;
   with a first general purpose graphics processing unit instance, estimating first item parameter values for each of the first plurality of assessment items based on the assessment data and a modified two-parameter item response theory model;
   with a second general purpose graphics processing unit instance, estimating second item parameter values for each of the second plurality of assessment items based on the assessment data and the modified two parameter item response theory model, wherein the first general purpose graphics processing unit instance and the second general purpose graphics processing unit instance estimate the first item parameter values and the second item parameter values in parallel, and wherein estimating the first item parameter values for each of the first plurality of assessment items based on the assessment data and the modified two-parameter item response theory model comprises iteratively applying a gradient descent optimization algorithm and a loss function to estimate the first item parameter values; and
   with the processor, causing the estimated first item parameter values and the estimated second item parameter values to be stored in a target database.

10. The method of claim 9, wherein the hint usage value indicates whether a hint is used prior to responding to a corresponding assessment item.

11. The method of claim 9, wherein, for a given assessment item of the plurality of assessment items, the estimated first item parameter values comprise a difficulty value, a discrimination value, and a hint change value, wherein the difficulty value is an estimate of difficulty of the given assessment item, wherein the discrimination value is an estimate of how well the given assessment item can discriminate between user responders having different abilities, and wherein the hint change value is an estimate of how the difficulty of the given assessment item is affected by hint usage.

12. The method of claim 11, wherein the modified two-parameter item response theory model determines an estimated correct first response probability value for the given assessment item based on the difficulty value, the discrimination value, the hint change value, an estimated ability value of a user responder that is an estimate of a latent ability of the user responder, and a hint usage value that indicates whether the user responder used a hint prior to responding to the given assessment item.

13. The method of claim 12, further comprising:
   performing verification of a subset of the estimated first item parameter values that correspond to the given assessment item by:
      calculating a set of correct first response probability values using the modified two-parameter item response theory model based on at least the difficulty value, the discrimination value, and the hint change value; and
      calculating cross entropy loss and mean squared error between each value of the set of correct first response probability values and corresponding grades of the assessment data.

14. The method of claim 13, further comprising:
   pre-processing the assessment data to divide the assessment data into first and second batches, wherein the first batch corresponds to the first title, and the second batch corresponds to the second title;
   causing the first general purpose graphics processing unit instance to estimate the first item parameter values based on the first batch; and
   causing the second general purpose graphics processing unit instance to estimate the second item parameter values based on the second batch.

15. A non-transitory computer-readable storage medium having instructions stored thereon that, when executed by at least one processor, cause the at least one processor to implement operations comprising:
   retrieving assessment data from a source database, the assessment data corresponding to a plurality of titles, the plurality of titles each including a plurality of digital assessments, and the plurality of digital assessments each including a plurality of assessment items, wherein the assessment data includes a plurality of entries, a given entry of the plurality of entries comprising a user identification for a user responder, an assessment item identifier that identifies an assessment item, a grade for a response to the assessment item submitted by the user responder, and a hint usage value;

initiating at least one general purpose graphics processing unit instance;

with the at least one general purpose graphics processing unit instance, determining at least one estimated item parameter value of at least one assessment item of the plurality of assessment items based on the assessment data and a modified two-parameter item response theory model by iteratively applying a gradient descent optimization algorithm and a loss function;

with the at least one general purpose graphics processing unit instance, performing verification of the at least one estimated item parameter value; and causing the at least one estimated item parameter value to be stored in a target database.

16. The computer-readable medium of claim 15, wherein the at least one general purpose graphics processing unit comprises:
   a first general purpose graphics processing unit instance configured to estimate first difficulty values, first discrimination values, and first hint change values for all assessment items of a first title of the plurality of titles based on the assessment data and the modified two-parameter item response theory model; and
   a second general purpose graphics processing unit instance configured to estimate second difficulty values, second discrimination values, and second hint change values for all assessment items of a second title of the plurality of titles based on the assessment data and the modified two-parameter item response theory model, wherein the first and second general purpose graphics processing unit instances are configured to operate in parallel.

17. The computer-readable medium of claim 15, wherein the hint usage value indicates whether a hint is used prior to responding to a corresponding assessment item.

18. The computer-readable medium of claim 15, wherein the at least one estimated item parameter value includes a difficulty value, a discrimination value, and a hint change value for the at least one assessment item.

19. The computer-readable medium of claim 18, wherein:
   the loss function comprises a sum of a cross entropy component, an ability mean component, and an ability standard deviation component;
   the cross entropy component comprises cross entropy loss between a set of correct first response probability values and corresponding grades of the pre-processed assessment data, wherein the ability mean component comprises an absolute value of a mean of estimated ability values for all user responders of a corresponding title of the plurality of titles; and
   the ability standard deviation component comprises an absolute value of a standard deviation of the estimated ability values for all user responders of the corresponding title.

20. The computer-readable medium of claim 15, wherein performing verification of the at least one estimated item parameter value comprises:
   calculating a set of correct first response probability values based on the at least one estimated item parameter; and
   calculating cross entropy loss and mean squared error between each value of the set of correct first response probability values and corresponding grades of the pre-processed assessment data.

* * * * *